US009959665B2

(12) United States Patent
Duvvuru et al.

(10) Patent No.: US 9,959,665 B2
(45) Date of Patent: May 1, 2018

(54) ZERO PIXEL CULLING FOR GRAPHICS PROCESSING

(71) Applicant: QUALCOMM Incorporated, San Diego, CA (US)

(72) Inventors: Nagarjuna Duvvuru, Bangalore (IN); Tao Wang, Sunnyvale, CA (US); Jian Liang, San Diego, CA (US); Chunlin Wang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 239 days.

(21) Appl. No.: 14/805,088

(22) Filed: Jul. 21, 2015

(65) Prior Publication Data

US 2017/0024926 A1    Jan. 26, 2017

(51) Int. Cl.
| | | |
|---|---|---|
| *G06T 15/00* | (2011.01) | |
| *G06T 15/30* | (2011.01) | |
| *G06T 15/40* | (2011.01) | |
| *G06T 11/40* | (2006.01) | |

(52) U.S. Cl.
CPC .............. *G06T 15/40* (2013.01); *G06T 11/40* (2013.01); *G06T 15/005* (2013.01); *G06T 2200/04* (2013.01); *G06T 2200/12* (2013.01); *G06T 2200/28* (2013.01)

(58) Field of Classification Search
None
See application file for complete search history.

(56) References Cited

U.S. PATENT DOCUMENTS

| | | |
|---|---|---|
| 7,119,809 B1 | 10/2006 | McCabe |
| 7,307,628 B1 | 12/2007 | Goodman et al. |
| 7,388,582 B2 | 6/2008 | Farinelli |
| 7,468,726 B1 | 12/2008 | Wloka et al. |
| 2003/0122815 A1 | 7/2003 | Deering et al. |

(Continued)

FOREIGN PATENT DOCUMENTS

WO    2004086309 A2    10/2004

OTHER PUBLICATIONS

International Search Report and Written Opinion from International Application PCT/US2016/034456—ISA/EPO, dated Oct. 5, 2016, 22 pp.

(Continued)

*Primary Examiner* — Andrew G Yang
(74) *Attorney, Agent, or Firm* — Shumaker & Sieffert, P.A.

(57) ABSTRACT

A graphics processing unit (GPU) may include a triangle setup engine (TSE) configured to determine coordinates of a triangle, rotate coordinates of the triangle based on an angle. To rotate the coordinates, the TSE generates coordinates of the triangle in a rotated domain, and determines coordinates of a bounding box in the rotated domain based on the coordinates of the triangle in the rotated domain. The TSE determines a first plurality of parallel scanlines in the rotated domain, and a second plurality of parallel scanlines in the rotated domain. The first and second pluralities of scanlines are perpendicular. The TSE determines whether the bounding box coordinates are located within two adjacent scanlines. If the bounding box coordinates are located within the two adjacent scanlines, the TSE removes the triangle from the scene.

22 Claims, 8 Drawing Sheets

(56) References Cited

U.S. PATENT DOCUMENTS

| | | | | |
|---|---|---|---|---|
| 2003/0179195 | A1* | 9/2003 | Ordentlich | G06T 15/005 345/420 |
| 2004/0130552 | A1 | 7/2004 | Duluk et al. | |
| 2007/0229546 | A1* | 10/2007 | Klassen | G01C 21/367 345/649 |
| 2015/0178983 | A1* | 6/2015 | Akenine-Moller | G06T 15/80 345/426 |
| 2016/0133045 | A1* | 5/2016 | Akenine-Moller | G06T 11/40 345/421 |

OTHER PUBLICATIONS

Park et al., "Hierarchical Contribution Culling for Fast Rendering of Complex Scenes," Advances in Image and Video Technology Lecture Notes in Computer Science, LNCS, Springer, Berlin, DE, vol. 4319, Jan. 2006, pp. 1324-1333, XP019052907, ISBN: 978-3-540-68297-4.

Partial International Search Report from International Application PCT/US2016/034456, dated Aug. 12, 2016, 12 pp.

Toledo, "A Brief Introduction to Massive Polygons Environment at Aircraft Industry's VR Applications," NIAR, 2003, XP002760208, Retrieved from the Internet: URL:https://www.niar.wichita.edu/researchlabs/pdf/Massive_Polygons_at_Aviation_Industry.pdf [retrieved on Jul. 21, 2016] 83 pp.

Second Written Opinion issued in International Application PCT/US2016/034456, dated Mar. 28, 2017, 14 pp.

International Preliminary Report on Patentability of International Application No. PCT/US2016/034456, dated Jun. 29, 2017, 29 pp.

\* cited by examiner

ZERO PIXEL CULLING FOR GRAPHICS PROCESSING

TECHNICAL FIELD

This disclosure relates to techniques for graphics processing.

BACKGROUND

Visual content for display, such as content for graphical user interfaces and video games, may be generated by a graphics processing unit (GPU). A GPU may convert two-dimensional or three-dimensional (3D) objects into a two-dimensional (2D) pixel representation that may be displayed. Converting information about 3D objects into a bit map that can be displayed is known as pixel rendering, and requires considerable memory and processing power. In the past, 3D graphics capability was available only on powerful workstations. However, now 3D graphics accelerators are commonly found in personal computers (PC), as well as in embedded devices, such as smart phones, tablet computers, portable media players, portable video gaming consoles, and the like. Typically, embedded device have less computational power and memory capacity as compared to conventional PCs. As such, increased complexity in 3D graphics rendering techniques presents difficulties when implementing such techniques on an embedded system.

SUMMARY

This disclosure describes techniques for performing zero pixel culling in a graphics processing unit (GPU). In examples of the disclosure, a GPU may be configured to cull (remove) primitives that will not be visible if rendered. The GPU may cull primitives that have zero pixels by performing a technique referred to as "zero pixel culling." During zero pixel culling, the GPU may cull a primitive based on whether the primitive intersects with scanlines generated by the GPU. The techniques of this disclosure improve the efficiency of zero pixel culling by using scanlines that are not oriented tangent to the x- and y-axes.

In one example of the disclosure, a method for culling primitives of a scene comprises determining coordinates of a triangle, wherein the triangle is part of a scene to be rendered by the GPU, rotating the coordinates of the triangle based on an angle, wherein rotating the coordinates of the triangle generates coordinates of the triangle in a rotated domain, determining coordinates of a bounding box in the rotated domain based on the coordinates of the triangle in the rotated domain, determining a first plurality of parallel scanlines in the rotated domain, determining a second plurality of parallel scanlines in the rotated domain, wherein the second plurality of parallel scanlines is perpendicular to the first plurality of parallel scanlines, determining whether the bounding box coordinates in the rotated domain are located within a first two adjacent scanlines of the first plurality of scanlines or within a second two adjacent scanlines of the second plurality of scanlines, responsive to determining that the bounding box coordinates are located within the first two adjacent scanlines or the second two adjacent scanlines, removing the triangle from the scene.

In another example of the disclosure, a device comprises a graphics processing unit (GPU), the GPU configured to determine coordinates of a triangle, wherein the triangle is part of a scene to be rendered by the GPU, rotate the coordinates of the triangle based on an angle, wherein to rotate the coordinates of the triangle, the at least one processor is configured to generate coordinates of the triangle in a rotated domain, determine coordinates of a bounding box in the rotated domain based on the coordinates of the triangle in the rotated domain, determine a first plurality of parallel scanlines in the rotated domain, determine a second plurality of parallel scanlines in the rotated domain, wherein the second plurality of parallel scanlines is perpendicular to the first plurality of parallel scanlines, determine whether the bounding box coordinates in the rotated domain are located within a first two adjacent scanlines of the first plurality of scanlines or within a second two adjacent scanlines of the second plurality of scanlines, and responsive to determining that the bounding box coordinates are located within the first two adjacent scanlines or the second two adjacent scanlines, remove the triangle from the scene In another example of this disclosure, a device comprises means for determining coordinates of a triangle, wherein the triangle is part of a scene to be rendered, means for rotating the coordinates of the triangle based on an angle, wherein the means for rotating the coordinates of the triangle comprises means for generating coordinates of the triangle in a rotated domain, means for determining coordinates of a bounding box in the rotated domain based on the coordinates of the triangle in the rotated domain, means for determining a first plurality of parallel scanlines in the rotated domain, means for determining a second plurality of parallel scanlines in the rotated domain, wherein the second plurality of parallel scanlines is perpendicular to the first plurality of parallel scanlines, means for determining whether the bounding box coordinates in the rotated domain are located within a first two adjacent scanlines of the first plurality of scanlines or within a second two adjacent scanlines of the second plurality of scanlines, and means for removing the triangle from the scene responsive to determining that the bounding box coordinates are located within the first two adjacent scanlines or the second two adjacent scanlines.

In another example of this disclosure, a non-transitory computer-readable storage medium includes instructions stored thereon that, when executed, cause at least one processor to determine coordinates of a triangle, wherein the triangle is part of a scene to be rendered by the GPU, rotate the coordinates of the triangle based on an angle, wherein the instructions that cause the at least one processor to rotate the coordinates of the triangle cause the at least one processor to generate coordinates of the triangle in a rotated domain, determine coordinates of a bounding box in the rotated domain based on the coordinates of the triangle in the rotated domain, determine a first plurality of parallel scanlines in the rotated domain, determine a second plurality of parallel scanlines in the rotated domain, wherein the second plurality of parallel scanlines is perpendicular to the first plurality of parallel scanlines, determine whether the bounding box coordinates in the rotated domain are located within a first two adjacent scanlines of the first plurality of scanlines or within a second two adjacent scanlines of the second two adjacent scanlines, and responsive to determining that the bounding box coordinates are located within the first two adjacent scanlines or the second plurality of adjacent scanlines, remove the triangle from the scene.

The details of one or more examples of the disclosure are set forth in the accompanying drawings and the description below. Other features, objects, and advantages of the disclosure will be apparent from the description and drawings, and from the claims.

DETAILED DESCRIPTION

GPUs may render three-dimensional scenes made of polygons and/or process two-dimensional arrays of pixels. A GPU may apply and render one or more textures to each of the polygons. During the process of image rendering, a GPU may be configured to perform various culling operations to remove primitives having pixels that will not be visible if rendered. Examples of culling operations include: backface culling, frustrum culling, viewport culling, and zero pixel culling. The techniques of this disclosure are related to zero pixel culling. Zero pixel culling is a process in which a GPU determines whether pixels of a triangle will not be visible when rendered because the pixels associated with a primitive will be smaller than one pixel (i.e., will be zero pixels in size). Zero pixel culling will be discussed in greater detail below.

In some examples, to perform zero pixel culling, a GPU generates a series of horizontal and vertical scanlines. For a given primitive, the GPU generates a bounding box surrounding that primitive. The GPU then determines whether the bounding box fits within two adjacent horizontal scanlines or two adjacent scanlines. Scanlines comprise a set of perpendicular vertical and horizontal lines. In this disclosure, the scanlines may correspond to locations of pixel values or sample values for output. If the bounding box fits entirely within the two adjacent horizontal scanlines or adjacent vertical scanlines, the GPU determines that the primitive will have zero visible pixels if rendered. Based on the determination that the primitive will have zero visible pixels, the GPU may cull (remove) the primitive from the scene to be rendered. By removing invisible primitives, the GPU may increase rendering performance because the culled zero pixel primitives will not be rasterized by the GPU.

This disclosure proposes techniques for improving zero pixel culling techniques by configuring the GPU to rotate the primitive based on an angle. Rotating the coordinates of the primitive places the coordinate in a rotated, u-v domain. After rotating the primitive, the GPU is configured to generate a bounding box around the rotated primitive coordinates. If the primitive is located within two parallel scanlines in the u-v domain, then the GPU culls the primitive. The parallel scanlines in the u-v domain are oriented perpendicular to each other, but are oriented at an angle relative to the x-y scanlines of traditional zero pixel culling. Additional examples of the techniques of this disclosure will be described in greater detail below.

Figure 1:
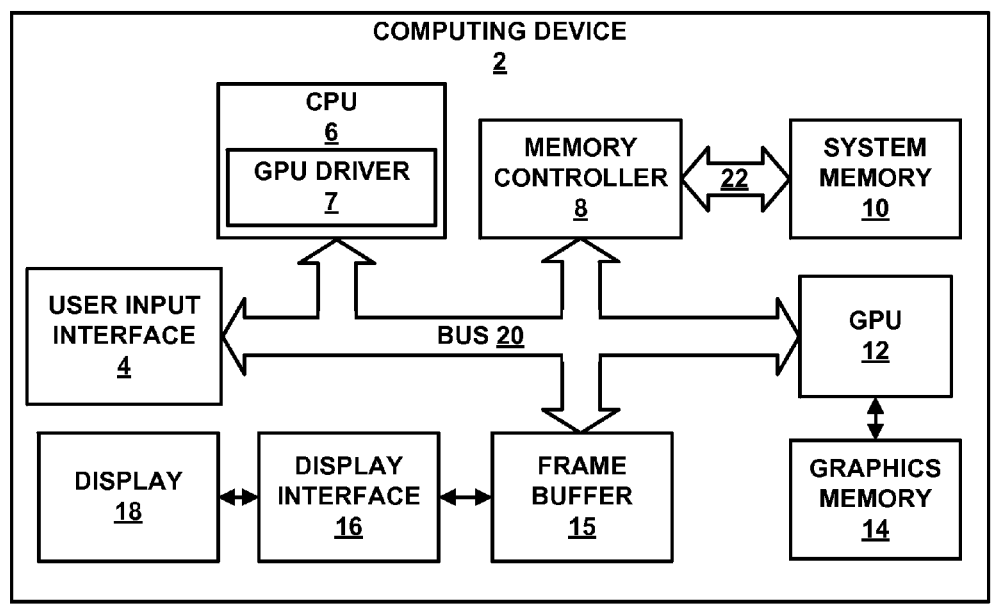
FIG. 1 is a block diagram showing an example computing device configured to use the techniques of this disclosure.

FIG. 1 is a block diagram illustrating an example computing device 2 that may be used to implement the techniques of this disclosure for perform zero pixel culling in a graphics processing unit (GPU). Computing device 2 may comprise, for example, a personal computer, a desktop computer, a laptop computer, a tablet computer, a computer workstation, a video game platform or console, a mobile telephone such as, e.g., a cellular or satellite telephone, a landline telephone, an Internet telephone, a handheld device such as a portable video game device or a personal digital assistant (PDA), a personal music player, a video player, a display device, a television, a television set-top box, a server, an intermediate network device, a mainframe computer, any mobile device, or any other type of device that processes and/or displays graphical data.

As illustrated in the example of FIG. 1, computing device 2 may include user input interface 4, central processing unit (CPU) 6, memory controller 8, system memory 10, GPU 12, graphics memory 14, display interface 16, display 18 and buses 20 and 22. Note that in some examples, graphics memory 14 may be "on-chip" with GPU 12. That is, graphics memory 14 may be accessible by GPU 12 without using any shared buses (e.g., bus 20 or bus 22). In some cases, CPU 6, memory controller 8, GPU 12, and graphics memory 14, and possibly display interface 16 shown in FIG. 1 may be on-chip, for example, in a system on a chip (SoC) design. User input interface 4, CPU 6, memory controller 8, GPU 12 and display interface 16 may communicate with each other using bus 20. Memory controller 8 and system memory 10 may also communicate with each other using bus 22. Buses 20, 22 may be any of a variety of bus structures, such as a third generation bus (e.g., a HyperTransport bus or an InfiniBand bus), a second generation bus (e.g., an Advanced Graphics Port bus, a Peripheral Component Interconnect (PCI) Express bus, or an Advanced eXentisible Interface (AXI) bus) or another type of bus or device interconnect. It should be noted that the specific configuration of buses and communication interfaces between the different components shown in FIG. 1 is merely exemplary, and other configurations of computing devices and/or other graphics processing systems with the same or different components may be used to implement the techniques of this disclosure.

CPU 6 may comprise a general-purpose or a special-purpose processor that controls operation of computing device 2. A user may provide input to computing device 2 to cause CPU 6 to execute one or more software applications. The software applications that execute on CPU 6 may include, for example, an operating system, a word processor application, an email application, a spread sheet application, a media player application, a video game application, a graphical user interface application or another program. Additionally, CPU 6 may execute GPU driver 7 for controlling the operation of GPU 12. The user may provide input to computing device 2 via one or more input devices (not shown) such as a keyboard, a mouse, a microphone, a touch pad or another input device that is coupled to computing device 2 via user input interface 4.

The software applications that execute on CPU 6 may include one or more graphics rendering instructions that instruct CPU 6 to cause the rendering of graphics data to display 18. In some examples, the software instructions may conform to a graphics application programming interface (API), such as, e.g., an Open Graphics Library (OpenGL®)

API, an Open Graphics Library Embedded Systems (OpenGL ES) API, a Direct3D API, an X3D API, a RenderMan API, a WebGL API, or any other public or proprietary standard graphics API. In order to process the graphics rendering instructions, CPU 6 may issue one or more graphics rendering commands to GPU 12 (e.g., through GPU driver 7) to cause GPU 12 to perform some or all of the rendering of the graphics data. In some examples, the graphics data to be rendered may include a list of graphics primitives, e.g., points, lines, triangles, quadrilaterals, triangle strips, etc.

In other examples, the software instructions that execute on CPU 6 may cause GPU 12 to execute a general purpose shader for performing more general computations applicable to be executed by the highly parallel nature of GPU hardware. Such general-purpose applications may be a so-called general-purpose graphics processing unit (GPGPU) and may conform to a general-purpose API, such as OpenCL.

Memory controller 8 facilitates the transfer of data going into and out of system memory 10. For example, memory controller 8 may receive memory read and write commands, and service such commands with respect to system memory 10 in order to provide memory services for the components in computing device 2. Memory controller 8 is communicatively coupled to system memory 10 via memory bus 22. Although memory controller 8 is illustrated in FIG. 1 as being a processing module that is separate from both CPU 6 and system memory 10, in other examples, some or all of the functionality of memory controller 8 may be implemented on one or both of CPU 6 and system memory 10.

System memory 10 may store program modules and/or instructions that are accessible for execution by CPU 6 and/or data for use by the programs executing on CPU 6. For example, system memory 10 may store a window manager application that is used by CPU 6 to present a graphical user interface (GUI) on display 18. In addition, system memory 10 may store user applications and application surface data associated with the applications. System memory 10 may additionally store information for use by and/or generated by other components of computing device 2. For example, system memory 10 may act as a device memory for GPU 12 and may store data to be operated on by GPU 12 as well as data resulting from operations performed by GPU 12. For example, system memory 10 may store any combination of texture buffers, depth buffers, stencil buffers, vertex buffers, frame buffers, or the like. System memory 10 may include one or more volatile or non-volatile memories or storage devices, such as, for example, random access memory (RAM), static RAM (SRAM), dynamic RAM (DRAM), read-only memory (ROM), erasable programmable ROM (EPROM), electrically erasable programmable ROM (EEPROM), Flash memory, a magnetic data media or an optical storage media.

GPU 12 may be configured to perform graphics operations to render one or more graphics primitives to display 18. Thus, when one of the software applications executing on CPU 6 requires graphics processing, CPU 6 may provide graphics commands and graphics data to GPU 12 for rendering to display 18. The graphics data may include, e.g., drawing commands, state information, primitive information, texture information, etc. GPU 12 may, in some instances, be built with a highly-parallel structure that provides more efficient processing of complex graphic-related operations than CPU 6. For example, GPU 12 may include a plurality of processing elements that are configured to operate on multiple vertices or pixels in a parallel manner. The highly parallel nature of GPU 12 may, in some instances, allow GPU 12 to draw graphics images (e.g., GUIs and two-dimensional (2D) and/or three-dimensional (3D) graphics scenes) onto display 18 more quickly than drawing the scenes directly to display 18 using CPU 6.

GPU 12 may, in some instances, be integrated into a motherboard of computing device 2. In other instances, GPU 12 may be present on a graphics card that is installed in a port in the motherboard of computing device 2 or may be otherwise incorporated within a peripheral device configured to interoperate with computing device 2. GPU 12 may include one or more processors, such as one or more microprocessors, application specific integrated circuits (ASICs), field programmable gate arrays (FPGAs), digital signal processors (DSPs), or other equivalent integrated or discrete logic circuitry.

GPU 12 may be directly coupled to graphics memory 14. Thus, GPU 12 may read data from and write data to graphics memory 14 without using bus 20. In other words, GPU 12 may process data locally using a local storage, instead of off-chip memory. This allows GPU 12 to operate in a more efficient manner by eliminating the need of GPU 12 to read and write data via bus 20, which may experience heavy bus traffic. In some instances, however, GPU 12 may not include a separate memory, but instead utilize system memory 10 via bus 20. Graphics memory 14 may include one or more volatile or non-volatile memories or storage devices, such as, e.g., random access memory (RAM), static RAM (SRAM), dynamic RAM (DRAM), erasable programmable ROM (EPROM), electrically erasable programmable ROM (EEPROM), Flash memory, a magnetic data media or an optical storage media.

CPU 6 and/or GPU 12 may store rendered image data in a frame buffer 15. Frame buffer 15 may be an independent memory or may be allocated within system memory 10. Display interface 16 may retrieve the data from frame buffer 15 and configure display 18 to display the image represented by the rendered image data. In some examples, display interface 16 may include a digital-to-analog converter (DAC) that is configured to convert the digital values retrieved from the frame buffer into an analog signal consumable by display 18. In other examples, display interface 16 may pass the digital values directly to display 18 for processing. Display 18 may include a monitor, a television, a projection device, a liquid crystal display (LCD), a plasma display panel, a light emitting diode (LED) array, such as an organic LED (OLED) display, a cathode ray tube (CRT) display, electronic paper, a surface-conduction electron-emitted display (SED), a laser television display, a nanocrystal display or another type of display unit. Display 18 may be integrated within computing device 2. For instance, display 18 may be a screen of a mobile telephone. Alternatively, display 18 may be a stand-alone device coupled to computing device 2 via a wired or wireless communications link. For instance, display 18 may be a computer monitor or flat panel display connected to a personal computer via a cable or wireless link.

According to one example of the disclosure, as will be explained in more detail below, GPU 12 may be configured to determine coordinates of a triangle, wherein the triangle is part of a scene to be rendered by GPU 12, rotate the coordinates of the triangle based on an angle, wherein to rotate the points of the triangle, GPU 12 is configured to generate coordinates of the triangle in a rotated domain, determine coordinates of a bounding box in the rotated domain based on the coordinates of the triangle in the rotated domain, determine a first plurality of parallel scanlines in the rotated domain, determine a second plurality of parallel scanlines in the rotated domain, wherein the second plurality of parallel scanlines is perpendicular to the first plurality of parallel scanlines. GPU 12 may be further configured to determine whether the bounding box coordinates in the rotated domain are located within two adjacent scanlines of the first plurality of scanlines or the second plurality of scanlines. Responsive to determining that the bounding box coordinates are located within the two adjacent scanlines, GPU 12 may remove the triangle from the scene. It should be understood the techniques of this disclosure may be performed by fixed function hardware units of GPU 12, may be performed by programmable hardware units of GPU 12 executing software, or a combination of both.

Figure 2:
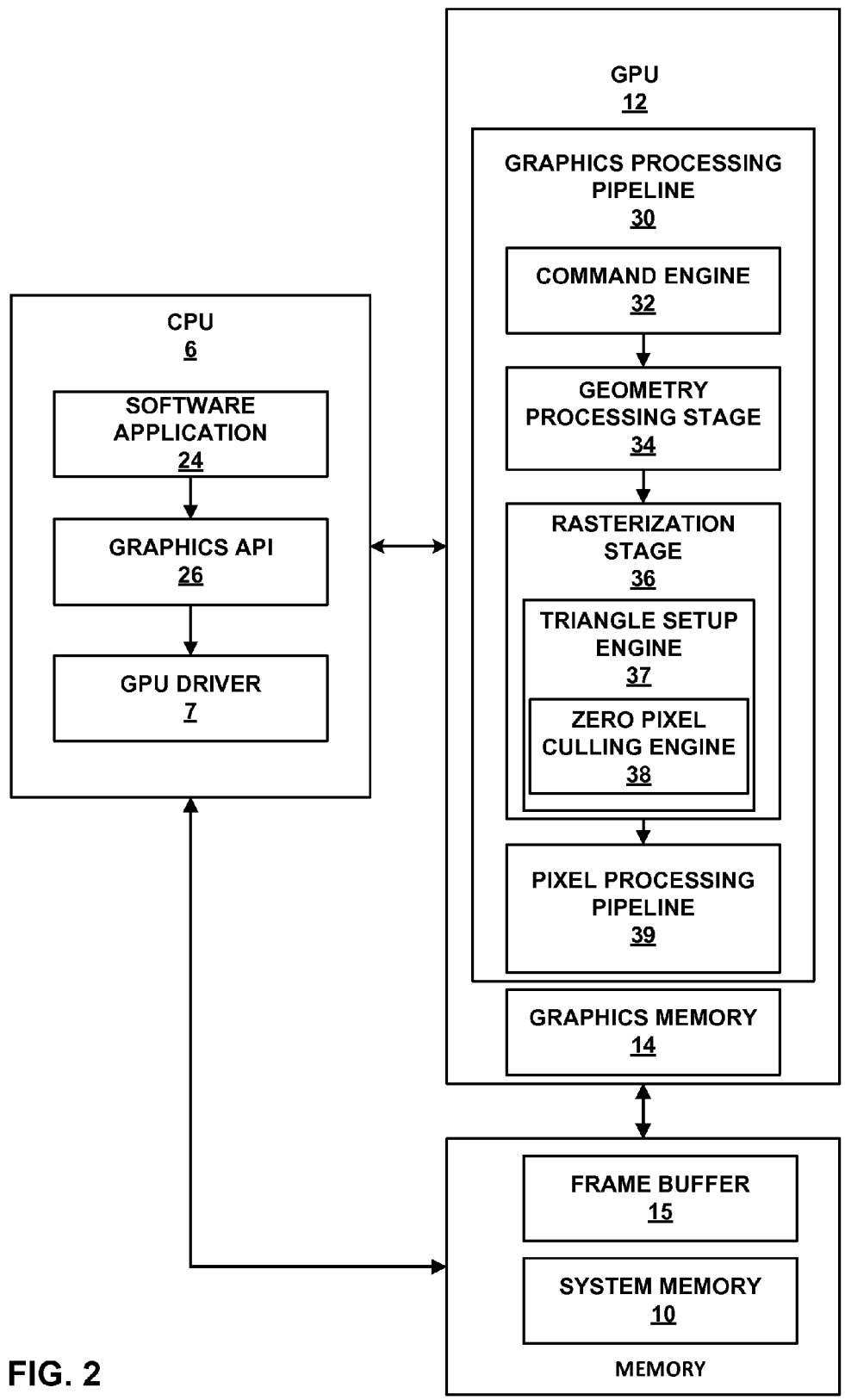
FIG. 2 is a block diagram showing components of FIG. 1 in more detail.

FIG. 2 is a block diagram illustrating example implementations of CPU 6, GPU 12, and system memory 10 of FIG. 1 in further detail. CPU 6 may include at least one software application 24, graphics API 26, and GPU driver 7, each of which may be one or more software applications or services that execute on CPU 6. GPU 12 may include graphics processing pipeline 30 that includes a plurality of graphics processing stages that operate together to execute graphics processing commands. GPU 12 may be configured to execute graphics processing pipeline 30 in a variety of rendering modes, including a binning rendering mode and a direct rendering mode. As shown in FIG. 2, graphics processing pipeline 30 may include command engine 32, geometry processing stage 34, rasterization stage 36, triangle setup engine 37, and pixel processing pipeline 39. Triangle setup engine 37 further includes zero pixel culling engine 38. Each of the components in graphics processing pipeline 30 may be implemented as fixed-function components, programmable components (e.g., as part of a shader program executing on a programmable shader unit), or as a combination of fixed-function and programmable components. Memory available to CPU 6 and GPU 12 may include system memory 10 and frame buffer 15. Frame buffer 15 may be a part of system memory 10 or may be separate from system memory 10. Frame buffer 15 may store rendered image data.

Software application 24 may be any application that utilizes the functionality of GPU 12. For example, software application 24 may be a GUI application, an operating system, a portable mapping application, a computer-aided design program for engineering or artistic applications, a video game application, or another type of software application that may utilize a GPU.

Software application 24 may include one or more drawing instructions that instruct GPU 12 to render a graphical user interface (GUI) and/or a graphics scene. For example, the drawing instructions may include instructions that define a set of one or more graphics primitives to be rendered by GPU 12. In some examples, the drawing instructions may, collectively, define all or part of a plurality of windowing surfaces used in a GUI. In additional examples, the drawing instructions may, collectively, define all or part of a graphics scene that includes one or more graphics objects within a model space or world space defined by the application.

Software application 24 may invoke GPU driver 7, via graphics API 26, to issue one or more commands to GPU 12 for rendering one or more graphics primitives into displayable graphics images. For example, software application 24 may invoke GPU driver 7, via graphics API 26, to provide primitive definitions to GPU 12. In some instances, the primitive definitions may be provided to GPU 12 in the form of a list of drawing primitives, e.g., triangles, rectangles, triangle fans, triangle strips, etc. The primitive definitions may include vertex specifications that specify one or more vertices associated with the primitives to be rendered. The vertex specifications may include positional coordinates for each vertex and, in some instances, other attributes associated with the vertex, such as, e.g., color coordinates, normal vectors, and texture coordinates.

The primitive definitions may also include primitive type information (e.g., triangle, rectangle, triangle fan, triangle strip, etc.), scaling information, rotation information, and the like. Based on the instructions issued by software application 24 to GPU driver 7, GPU driver 7 may formulate one or more commands that specify one or more operations for GPU 12 to perform in order to render the primitive. When GPU 12 receives a command from CPU 6, graphics processing pipeline 30 decodes the command and configures one or more processing elements within graphics processing pipeline 30 to perform the operation specified in the command. After performing the specified operations, graphics processing pipeline 30 outputs the rendered data to frame buffer 15 associated with a display device. Graphics processing pipeline 30 may be configured to execute in one of a plurality of different rendering modes, including a binning rendering mode and a direct rendering mode.

GPU driver 7 may be further configured to compile one or more shader programs, and to download the compiled shader programs onto one or more programmable shader units contained within GPU 12. The shader programs may be written in a high level shading language, such as, e.g., an OpenGL Shading Language (GLSL), a High Level Shading Language (HLSL), a C for Graphics (Cg) shading language, etc. The compiled shader programs may include one or more instructions that control the operation of a programmable shader unit within GPU 12. For example, the shader programs may include vertex shader programs and/or pixel shader programs. A vertex shader program may control the execution of a programmable vertex shader unit or a unified shader unit, and include instructions that specify one or more per-vertex operations. A pixel shader program may include pixel shader programs that control the execution of a programmable pixel shader unit or a unified shader unit, and include instructions that specify one or more per-pixel operations.

Graphics processing pipeline 30 may be configured to receive one or more graphics processing commands from CPU 6, via GPU driver 7, and to execute the graphics processing commands to generate displayable graphics images. As discussed above, graphics processing pipeline 30 includes a plurality of stages that operate together to execute graphics processing commands. It should be noted, however, that such stages need not necessarily be implemented in separate hardware blocks. For example, portions of geometry processing stage 34 and pixel processing pipeline 39 may be implemented as part of a unified shader unit. Again, graphics processing pipeline 30 may be configured to execute in one of a plurality of different rendering modes, including a binning rendering mode and a direct rendering mode.

Command engine 32 may receive graphics processing commands and configure the remaining processing stages within graphics processing pipeline 30 to perform various operations for carrying out the graphics processing commands. The graphics processing commands may include, for example, drawing commands and graphics state commands. The drawing commands may include vertex specification commands that specify positional coordinates for one or more vertices and, in some instances, other attribute values associated with each of the vertices, such as, e.g., color coordinates, normal vectors, texture coordinates and fog coordinates. The graphics state commands may include primitive type commands, transformation commands, lighting commands, etc. The primitive type commands may specify the type of primitive to be rendered and/or how the vertices are combined to form a primitive. The transformation commands may specify the types of transformations to perform on the vertices. The lighting commands may specify the type, direction and/or placement of different lights within a graphics scene. Command engine 32 may cause geometry processing stage 34 to perform geometry processing with respect to vertices and/or primitives associated with one or more received commands.

Geometry processing stage 34 may perform per-vertex operations and/or primitive setup operations on one or more vertices in order to generate primitive data for rasterization stage 36. Each vertex may be associated with a set of attributes, such as, e.g., positional coordinates, color values, a normal vector, and texture coordinates. Geometry processing stage 34 modifies one or more of these attributes according to various per-vertex operations. For example, geometry processing stage 34 may perform one or more transformations on vertex positional coordinates to produce modified vertex positional coordinates. Geometry processing stage 34 may, for example, apply one or more of a modeling transformation, a viewing transformation, a projection transformation, a ModelView transformation, a ModelViewProjection transformation, a viewport transformation and a depth range scaling transformation to the vertex positional coordinates to generate the modified vertex positional coordinates. In some instances, the vertex positional coordinates may be model space coordinates, and the modified vertex positional coordinates may be screen space coordinates. The screen space coordinates may be obtained after the application of the modeling, viewing, projection and viewport transformations. In some instances, geometry processing stage 34 may also perform per-vertex lighting operations on the vertices to generate modified color coordinates for the vertices. Geometry processing stage 34 may also perform other operations including, e.g., normal transformations, normal normalization operations, view volume clipping, homogenous division and/or backface culling operations. In various examples geometry processing stage 34 may perform filtering.

Geometry processing stage 34 may produce primitive data that includes a set of one or more modified vertices that define a primitive to be rasterized as well as data that specifies how the vertices combine to form a primitive. Each of the modified vertices may include, for example, modified vertex positional coordinates and processed vertex attribute values associated with the vertex. The primitive data may collectively correspond to a primitive to be rasterized by further stages of graphics processing pipeline 30. Conceptually, each vertex may correspond to a corner of a primitive where two edges of the primitive meet. Geometry processing stage 34 may provide the primitive data to rasterization stage 36 for further processing.

In some examples, all or part of geometry processing stage 34 may be implemented by one or more shader programs executing on one or more shader units. For example, geometry processing stage 34 may be implemented, in such examples, by a vertex shader, a geometry shader or any combination thereof. In other examples, geometry processing stage 34 may be implemented as a fixed-function hardware processing pipeline or as a combination of fixed-function hardware and one or more shader programs executing on one or more shader units.

Rasterization stage 36 may be configured to receive, from geometry processing stage 34, primitive data that represents a primitive to be rasterized, and to rasterize the primitive to generate a plurality of source pixels that correspond to the rasterized primitive. In some examples, rasterization stage 36 may determine which screen pixel locations are covered by the primitive to be rasterized, and generate a source pixel for each screen pixel location determined to be covered by the primitive. Rasterization stage 36 may determine which screen pixel locations are covered by a primitive by using techniques known to those of skill in the art, such as, e.g., an edge-walking technique, evaluating edge equations, etc. Rasterization stage 36 may provide the resulting source pixels to pixel processing pipeline 39 for further processing. Rasterization stage 36 may also be configured to perform anti-aliasing techniques as described herein. For example, rasterization stage 36 may be configured to perform multi-sample anti-aliasing (MSAA), super sample anti-aliasing (SSAA) and/or other anti-aliasing techniques not explicitly described herein.

The source pixels generated by rasterization stage 36 may correspond to a screen pixel location, e.g., a destination pixel, and be associated with one or more color attributes. All of the source pixels generated for a specific rasterized primitive may be said to be associated with the rasterized primitive. The pixels that are determined by rasterization stage 36 to be covered by a primitive may conceptually include pixels that represent the vertices of the primitive, pixels that represent the edges of the primitive and pixels that represent the interior of the primitive.

Rasterization stage 36 includes triangle setup engine (TSE) 37. Triangle setup engine (TSE) 37 may be configured to receive primitives, perform primitive setup, floating point to fixed point conversion, clipping, viewport transformation and culling. TSE 37 may be configured to generate variables used by rasterization stage 36, including the bounding box and edge equations. TSE 37 may also generates barycentric coefficients I, J, Z and W that are used for rendering. TSE 37 also include zero pixel culling engine 38. Zero pixel culling engine 38 may be configured to perform the zero pixel culling techniques of this disclosure.

Pixel processing pipeline 39 is configured to receive a source pixel associated with a rasterized primitive, and to perform one or more per-pixel operations on the source pixel. Per-pixel operations that may be performed by pixel processing pipeline 39 include, e.g., alpha test, texture mapping, color computation, pixel shading, per-pixel lighting, fog processing, blending, a pixel ownership test, a source alpha test, a stencil test, a depth test, a scissors test and/or stippling operations. In addition, pixel processing pipeline 39 may execute one or more pixel shader programs to perform one or more per-pixel operations. The resulting data produced by pixel processing pipeline 39 may be referred to herein as destination pixel data and stored in frame buffer 15. The destination pixel data may be associated with a destination pixel in frame buffer 15 that has the same display location as the source pixel that was processed. The destination pixel data may include data such as, e.g., color values, destination alpha values, depth values, etc.

Frame buffer 15 stores destination pixels for GPU 12. Each destination pixel may be associated with a unique screen pixel location. In some examples, frame buffer 15 may store color components and a destination alpha value for each destination pixel. For example, frame buffer 15 may store Red, Green, Blue, Alpha (RGBA) components for each pixel where the "RGB" components correspond to color values and the "A" component corresponds to a destination alpha value. Although frame buffer 15 and system memory 10 are illustrated as being separate memory units, in other examples, frame buffer 15 may be part of system memory 10.

In an example in accordance with the techniques of this disclosure, TSE 37 of GPU 12 may be configured to determine coordinates of a triangle, wherein the triangle is part of a scene to be rendered by GPU 12, rotate coordinates of the triangle based on an angle. To rotate the coordinates of the triangle, TSE 37 may be configured to generate coordinates of the triangle in a rotated domain, and determine coordinates of a bounding box in the rotated domain based on the coordinates of the triangle in the rotated domain. TSE 37 may be further configured to determine a first plurality of parallel scanlines in the rotated domain, and to determine a second plurality of parallel scanlines in the rotated domain. The second plurality of parallel scanlines is perpendicular to the first plurality of parallel scanlines. TSE 37 may be further configured to determine whether the bounding box coordinates in the rotated domain are located within two adjacent scanlines of the first plurality of scanlines or within two adjacent scanlines within the second plurality of scanlines. Responsive to determining that the bounding box coordinates are located within the two adjacent scanlines: TSE 37 may remove the triangle from the scene.

Figure 3:
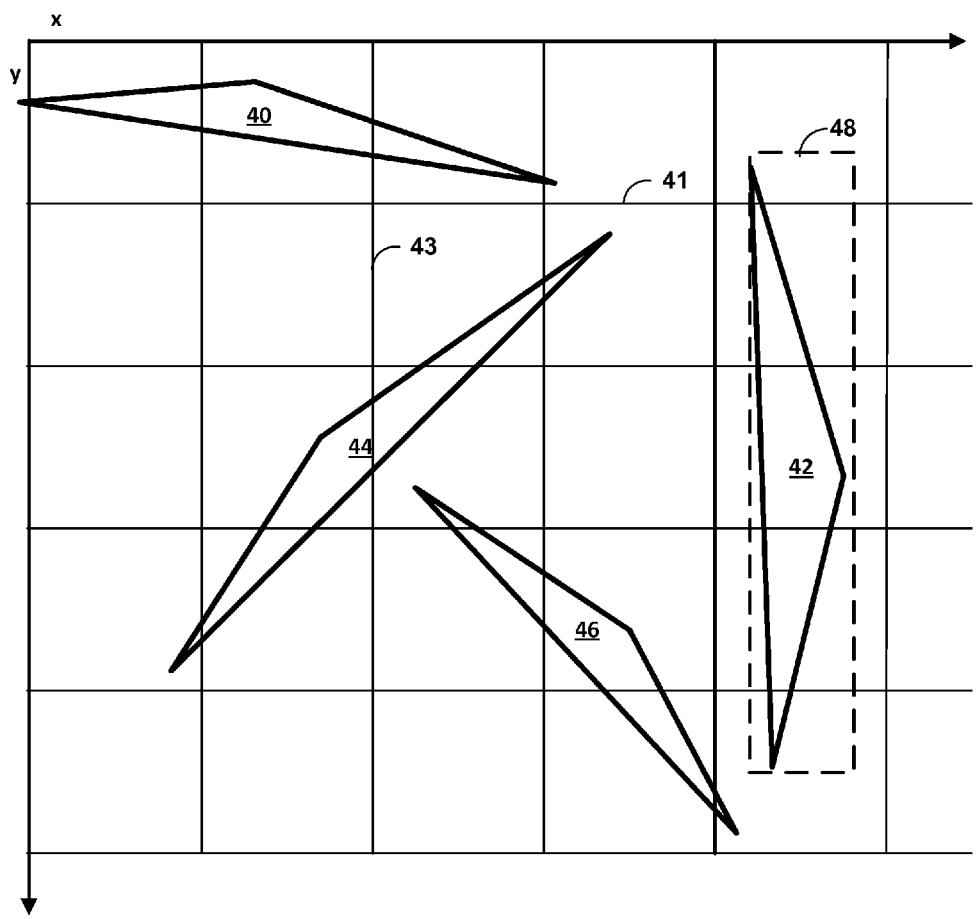
FIG. 3 is a conceptual diagram showing an example process of performing zero pixel culling.

FIG. 3 is a conceptual diagram showing an example process of performing zero pixel culling. FIG. 3 includes four triangles, 40, 42, 44, and 46. Triangles 40, 42, 44, and 46 are illustrated in an x-y Cartesian coordinates system. TSE 37 generates vertical scanlines, e.g. scanline 41, and horizontal scanlines, e.g. scanline 43, that are perpendicular to each other. The scanlines are illustrated as additional lines that are parallel to the x and y axes, and occur at regular intervals. The intersections of the scanlines correspond to locations of pixels that GPU 12 will be output to a subsequent stage in a graphics rendering pipeline. While the example of FIG. 3 shows perpendicular scanlines, it should be understood that, in other examples, non-perpendicular scanlines may also be used. For example, the x-axis may be rotated by one angle, and the y-axis may be rotated by another, different angle.

When performing zero pixel culling, TSE 37 determines whether a primitive, such as one of triangles 40, 42, 44, and 46 is located within a set of adjacent vertical scanlines or a set of adjacent horizontal scanlines. If the primitive is located only within an adjacent set of vertical or horizontal scanlines, TSE 37 determines that the pixels of the primitive will not be visible. The pixels of the primitive will not be visible because the pixels of the primitive will be so small as to not contribute to a visible pixel of a rendered frame. If the primitive will not be visible, TSE 37 may cull (remove) the primitive from the scene to be rendered. Removing the primitive from the scene allows GPU 12 to avoid performing additional rasterization computations related to rendering that primitive, and thus increases rendering performance.

To more quickly determine whether a triangle primitive is visible, TSE 37 may determine a bounding box that surrounds each triangle primitive. The bounding box is a rectangle that has a width equal to the distance between the two farthest points (i.e. the width) of the triangle, and a height equal to the height of the triangle. A sample bounding box 48 corresponding to triangle 42 is illustrated for ease of understanding. Each bounding box has four coordinates, as will be discussed in greater detail, below.

In the example of FIG. 3, TSE determines that triangle 40 is located within two adjacent horizontal scanlines, and therefore can be culled because it will result in zero rendered pixels. Similarly, TSE 37 determines that triangle 42 is located within two vertically adjacent scanlines, and therefore TSE 37 may cull triangle 42. Because triangles 44 and 46 are at an angle, and intersect two adjacent horizontal scanlines, and two adjacent vertical scanlines, TSE 37 cannot determine that triangles 44 and 46 should be culled even though triangles 44 and 46 are small enough that they will not correspond to any pixels if rendered.

Figure 4:
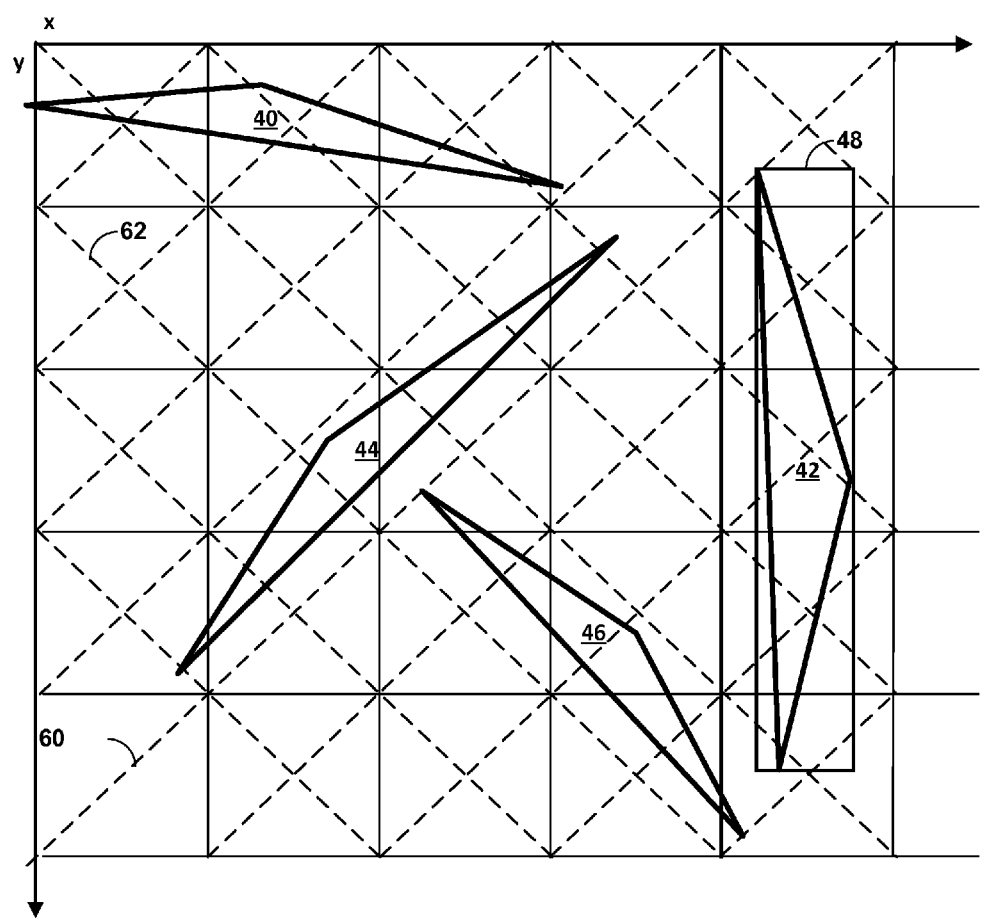
FIG. 4 is a conceptual diagram showing example process of performing zero pixel culling in accordance with the techniques of this disclosure.

FIG. 4 is a conceptual diagram showing example process of performing zero pixel culling in accordance with the techniques of this disclosure. Whereas FIG. 3 the process described with respect to FIG. 3 describes zero pixel culling techniques, these techniques do not remove zero pixel primitives that are oriented at an angle because the scanlines are oriented horizontally and vertically, and not an angle. In the example of FIG. 4, TSE 37 rotates the coordinates of primitives based on an angle to generate primitives in a rotated domain. By rotating the primitives, and by association the scanlines used for zero pixel culling, a GPU configured in accordance with the techniques may the number of primitives culled when performing zero pixel culling.

FIG. 4 illustrates the same triangles 40, 42, 44, and 46, as illustrated in FIG. 3. Unlike FIG. 3 however, FIG. 4 also includes perpendicular scanlines, e.g. scanlines 60, 62, which are illustrated as dashed lines, and that are oriented at an angle relative to the solid horizontal and vertical scanlines. Zero pixel culling engine 38 may cull primitives based on angular scanlines 60, and 62, etc. To perform zero pixel culling in accordance with the techniques of this disclosure, TSE 37 rotates the coordinates of triangles 40, 42, 44, 46 based on an angle. In various examples, the angle may be 45 degrees. However, in other examples, any other angle or combinations of angles may be used.

Rotating the x-y coordinates of triangles 40, 42, 44, 46 causes the coordinates to be placed in a domain, referred to as a "u-v" domain. Both the x-y coordinate systems and the u-v coordinates may comprise left-handed Cartesian coordinate system. Left-handed Cartesian coordinate systems generally include the x (u) component direct to the right. However unlike a traditional left-handed Cartesian coordinate system, the y (v) coordinate is directed downward (i.e. y-values increase when moving downward along the y-axis), rather than upward. The u-v domain is also a two-dimensional Cartesian domain. The u-v domain and coordinates in this disclosure is rotated by an angle relative to the x-y domain. The angle (θ) of rotation is oriented clockwise relative to the x axis.

TSE 37 may apply a transformation matrix to rotate the coordinates of triangles 40, 42, 44, 46 into the u-v domain. The transformation matrix may comprise:

$$\begin{bmatrix} u \\ v \end{bmatrix} = \begin{bmatrix} \cos\theta & -\sin\theta \\ \sin\theta & \cos\theta \end{bmatrix} \begin{bmatrix} x \\ y \end{bmatrix},$$

where x and y are the x- and y-coordinates of the triangle, and u and v are the u-v domain rotated coordinates. After rotating the coordinates, TSE 37 may determine coordinates for a bounding box for each of triangles 40, 42, 44, 46. Bounding box 48 corresponding to triangle 42 is again illustrated (this time having a solid border) for the purpose of example.

After determining the bounding box coordinates, TSE 37 then determines whether any of the bounding boxes associated with triangles 40, 42, 44, or 46 are located within two adjacent horizontal scanlines or within two adjacent vertical scanlines in the u-v domain. In the example of FIG. 4, the scanlines of the u-v domain are illustrated as angular dashed lines. The u-v domain scanlines are illustrated at an angle relative to the x-y axis due to the rotation that TSE 37 applies. Thus, in the example of FIG. 4, TSE 37 determines that the bounding boxes of triangles 44, and 46 are located completely within the adjacent, parallel angular scanlines.

TSE 37 determines that triangles 40 and 42 are not located completely within the adjacent parallel angular scanlines. TSE 37 does not cull triangles 40 and 42 in this example. However, TSE 37 may be configured to perform culling in the x-y domain and in the rotated x-y domain in some examples. For example, TSE 37 may be configured to cull primitives simultaneously for a plurality of different angles in a rotated x-y domain. Based on the determination that triangles 46 and 44 are located within parallel adjacent scanlines in the u-v domain, TSE 37 may cull triangles 44 and 46 because they will not correspond to any pixels if rendered. In other examples, TSE 37 may be configured to determine a shape of a primitive, assign an angle to the primitive (e.g., in the non-rotated x-y domain), and perform culling based on the assigned angle.

Figure 5:
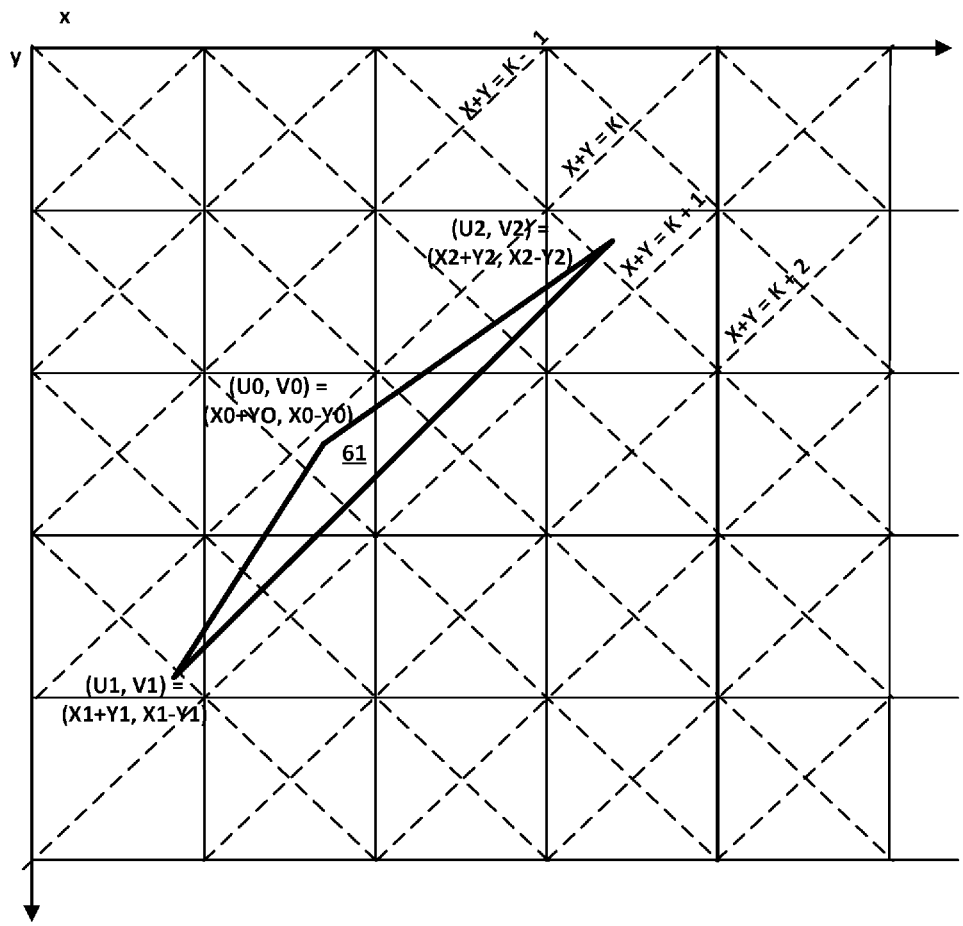
FIG. 5 is a conceptual diagram showing an example of a performing zero pixel culling texture in accordance with the techniques of this disclosure with additional detail.

FIG. 5 is a conceptual diagram showing an example of a performing zero pixel culling texture in accordance with the techniques of this disclosure with additional detail. In example of FIG. 5, TSE 37 has determined the coordinates of a triangle 61 to place in a u-v domain based on a given rotation angle. Each of the dashed angular lines correspond to scanlines. Each of the adjacent scanlines corresponds to an increment or decrement of one unit in the domain relative to the previous parallel adjacent scanline. Thus, for a given scanline k, an adjacent scanline would have value k+1 or k−1.

In the x-y domain, triangle 61 has a lower-left vertex with x-y coordinates (x1, y1), a middle vertex with coordinates (x0, y0), and a top-right vertex coordinate (x2, y2). After applying the rotation matrix to the preceding coordinates of triangle 61, the resulting u-v coordinates corresponding to (v1, v1) are (x1+y1, x1−y1). The u-v coordinates for (u0, v0) correspond to (x0+y0, x0−y0), and the coordinates for (u2, v2) correspond to (x2+y2, x2−y2).

After determining the rotated u-v coordinates for triangle 61, TSE 37 determines the u-v coordinates for the four corners of a bounding box surrounding triangle 61. TSE 37 determines the four coordinates of the bounding box as: (Umin, Vmin), (Umax, Vmin), (Umax, Vmax), and (Umin, Vmax), where Umax and Umin are the maximum and minimum u-coordinates of the triangle, and Vmin and Vmax are the maximum and minimum v-coordinates of the triangle, respectively. Based on the coordinates of the bounding box, TSE 37 determines whether the bounding box fits within two adjacent parallel horizontal or two adjacent vertical u-v domain scanlines. In some examples, TSE 37 may determine whether the bounding box is within two adjacent scanlines by determining whether the absolute value of the difference of Umax and Umin is greater less one. TSE 37 may also determine whether the absolute value of the difference of Vmax and Vmin is less than one. If either of the aforementioned difference values is less than one, then the bounding box fits within two adjacent scanlines. If the bounding box fits within two adjacent scanlines, TSE 37 may then cull triangle the primitive, i.e. triangle 61 in this example.

Figure 6:
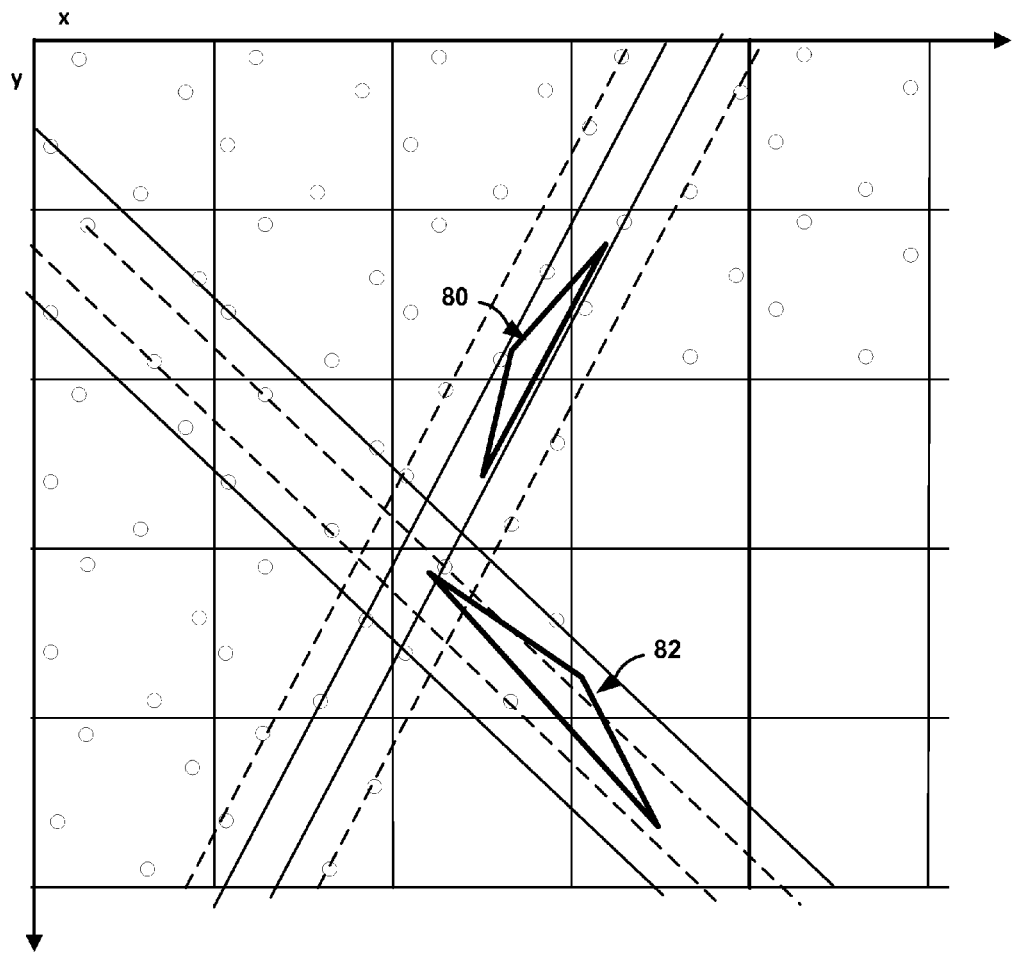
FIG. 6 is a conceptual diagram showing an example of performing zero pixel culling and multi-sample anti-aliasing in accordance with the techniques of this disclosure.

FIG. 6 is a conceptual diagram showing an example of performing zero pixel culling in conjunction with multi-sample anti-aliasing in accordance with the techniques of this disclosure. In the example of FIG. 6, two triangles, 82, and 84, comprise primitives of a scene. The primitives are illustrated relative to a Cartesian x-y axis, as well as a u-v domain corresponding to angular dashed and solid scanlines. The scanlines are either parallel or perpendicular to each other in the example of FIG. 6.

When rendering the scene of FIG. 6, GPU 12 performs anti-aliasing on the primitives of the scene. GPU 12 may perform anti-aliasing on the scene using multi-sample anti-aliasing (MSAA), super sample anti-aliasing (SSAA), and/or another anti-aliasing technique not explicitly described herein.

When performing anti-aliasing on a scene, GPU 12 essentially renders the scene at a higher (super-sampled) resolution than the final display resolution for the scene. More particularly, GPU 12 determines multiple samples for each pixel to be rendered in the final scene. GPU 12 downsamples (i.e. combines) the samples associated with each of the pixels to determine the final pixel values to be rendered. In the example of FIG. 6, 4 samples are determined for each pixel. Each of the sample locations within a single pixel are illustrated as circles within each scanline-bounded box. Various anti-aliasing techniques will now briefly be described.

SSAA is a more performance intensive technique of anti-aliasing in which a GPU performs downsampling without determining whether the samples to be downsampled belong to the same primitive, and without regard to whether the samples are located at the edge of a primitive. MSAA, is similar to SSAA. However, as a generalization in MSAA, and unlike SSAA, a shader unit only performs certain anti-aliasing calculations (e.g., downsampling) on pixels that cover more than one primitive. Reducing downsampling calculations, per MSAA, reduces the performance penalty of MSAA as compared to SSAA, in which downsampling is performed on every pixel.

As illustrated in FIG. 6, when GPU 12 performs anti-aliasing, GPU 12 samples each pixel of the scene multiple times. In FIG. 6, each pixel is sampled four times, which may correspond to 4×MSAA, as an example. When performing zero pixel culling in conjunction with anti-aliasing, TSE 37 rotates the coordinates of triangles 80 based on an angle, e.g. using the rotation matrix described above to place the triangle coordinates in the u-v domain.

However, rather than generating scanlines based on the intersections of pixel locations as in FIGS. 4-5, TSE 37 generates scanlines in the u-v domain that intersect the sample locations of each pixel. The solid and dashed angular scanlines are examples of such scanlines that intersect the sample locations. As described above with respect to FIGS. 3-5, if a bounding box generated for a primitive is located within two parallel scanlines, TSE 37 may cull that primitive. In the example of FIG. 6, triangle 82 is not within two adjacent scanlines. Thus, TSE 37 cannot cull triangle 82. Triangle 80 is located within two adjacent scanlines, so TSE 37 can cull triangle 80.

Because of the additional samples generated for each pixel when performing anti-aliasing, and the corresponding additional scanlines and their associated angles, TSE 37 may use a different rotation angle when performing zero pixel culling in conjunction with performing anti-aliasing. For example, TSE 37 may use a 63.5 degree rotation angle, e.g. when performing 4×MSAA. In some examples, TSE 37 may first use a 45 degree rotation angle when performing zero pixel culling in conjunction with performing anti-aliasing. TSE 37 may then use a 63.5 degree rotation angle, and cull any zero primitives when performing anti-aliasing. Using a 63.5 degree culling angle may result in a higher percentage of primitives culled when performing anti-aliasing, as will be discussed in greater detail below. Example pseudocode for performing the triangle rotation and culling determination will now be described.

First, TSE 37 receives an input triangle having vertices A, B, and C. The triangle has Cartesian vertex coordinates: A(x0,y0), B(x1,y1), and C(x2,y2)). TSE 37 also receives a rotation angle (T).

Next, TSE 37 determines coordinates of the triangle in the rotated domain according to the following equations:

$$x0'=\cos(T)*x0-\sin(T)*y0=u0$$

$$y0'=\sin(T)*x0+\cos(T)*y0=v0$$

$$x1'=\cos(T)*x1-\sin(T)*y1=u1$$

$$y1'=\sin(T)*x1+\cos(T)*y1=v1$$

$$x2'=\cos(T)*x2-\sin(T)*y2=u2$$

$$y2'=\sin(T)*x2+\cos(T)*y2=v2.$$

TSE 37 then determines the maximum and minimum u and v values according to the following equations:

$$u\text{Max}=\max(u0,u1,u2), u\text{Min}=\min(u1,u1,u2)$$

$$v\text{Max}=\max(v0,v1,v2), v\text{Min}=\min(v1,v1,v2),$$

where min is a function that returns the minimum value of its arguments, and max is a function that returns the maximum value of its arguments.

After determining the u-v coordinates and associated values, TSE 37 determines whether abs((uMax−uMin) or abs(vMax−vMin)<1),
where abs is the absolute value function. If the above condition is true, then TSE 37 may cull the primitive.

When performing MSAA, TSE 37 may execute in hardware, software, or combinations thereof, the following pseudocode to perform zero pixel culling.

```
u0 = x0+y0; v0=x0-y0 // n.8 precision
u1 = x1+y1; v1=x1-y1
u2 = x2+y2; v2=x2-y2
uMax = max(u0, u1, u2); uMin = min(u0, u1, u2) // n.8 precision
vMax = max(v0, v1, v2); vMin = min(v0, v1, v2)
switch(MSAA) {
    case 0: // 1xMSAA
    if(((uMax >> 8) == (uMin >> 8)) && ((uMin & 0xff) != 0)) {
        kill = true;
    }
    if(((vMax >> 8) == (vMin >> 8)) && ((vMin & 0xff) != 0)) {
        kill = true;
    }
    break;
    case 1: // 2xMSAA
    if(((vMax >> 8) == (vMin >> 8)) && ((vMin & 0xff) != 0)) {
        kill = true;
    }
    if((((uMax + 0x80) >> 7) == ((uMin + 0x80) >> 7)) && (((uMin + 0x80) & 0x7f) != 0)) {
        kill = true;
    }
    break;
    case 2: // 4xMSAA
    if((((vMax + 0x40) >> 7) == ((vMin + 0x40) >> 7)) && (((vMin + 0x40) & 0x7f) != 0))
    {
        if (((vMin+0x40)&0x80) == 0) {
            kill = true;
        }
    }
    if((((uMax + 0x40) >> 7) == ((uMin + 0x40) >> 7)) && (((uMin + 0x40) & 0x7f) != 0))
    {
        if (((uMin+0x40)&0x80) == 0) {
            kill = true;
        }
    }
    break;
    case 3:
    case 4:
    break;
```

The zero pixel culling techniques of this disclosure may be performed in floating point or fixed point format. In the example above, a fixed point format with a precision of 8 fractional bits (n.8 precision) is used.

Various performance improvements associated with the techniques of this disclosure will now be discussed. GFXBench is a commonly-used graphics performance benchmark, which consists of several scenes rendered by a GPU. Some of the test scenes include "Egypt," "T-Rex," and "Manhattan." Table 1 describes the percentage improvements in primitive culling rate by using a 45 degree rotation angle in conjunction with various MSAA modes:

TABLE 1

Zero Pixel Culling Improvement With 45 Degree Angle

| GFXBench Scene | Total primitive | Killed primitives by using 45 degree bounding box (1xMSAA) | Killed primitives by 45 degree bounding box (2xMSAA) | Killed primitives by using 45 degree bounding box (4xMSAA) |
|---|---|---|---|---|
| Egypt | 161,146 | 4,857 (3.0%) | 3264 (2.0%) | 979 (0.6%) |
| T-Rex | 298,482 | 898 (0.3%) | 606 (0.2%) | 100 (.00033%) |
| Manhattan | 188,034 | 8,296 (4.4%) | 6368 (3.4%) | 2696 (1.4%) |

Thus, in almost every scene, using a 45 degree rotation when performing zero pixel culling results in a performance improvement. However, in the 4×MSAA case, the zero primitive culling percentage rate is relatively lower. To address this case, TSE 37 may utilize a 63.5 degree rotation when performing zero pixel culling in various examples. In some examples, TSE 37 may perform zero pixel culling at 45 degree angle and then perform zero pixel culling at a 63.5 angle. The performance improvement of various angle combinations at 4×MSAA is described in Table 2, below.

TABLE 2

Zero Pixel Culling With 4xMSAA

| 4xMSAA | Total primitive | 45 degree rotation bounding box (4xMSAA) | Addition killing by 4xMSAA pattern rotation bounding box | Total kill (45 degree rotation BB + AA pattern rotation bounding box) | 4xMSAA pattern rotation bounding box alone |
|---|---|---|---|---|---|
| Egypt | 161,146 | 979 (0.6%) | 1011 (0.6%) | 1990 (1.2%) | 1255 (0.8%) |
| T-Rex | 298,482 | 100 | 154 | 254 | 166 |
| Manhattan | 188,034 | 2696 (1.4%) | 1554 (0.8%) | 4250 (2.3%) | 2950 (1.6%) |

Thus, as described in Table 2, using a 63.5 degree rotation may slightly improve the percentage of primitives culled. Using both 45 degree and 63.5 degree rotations when performing zero pixel culling may further improve the percentage of primitives culled.

Figure 7:
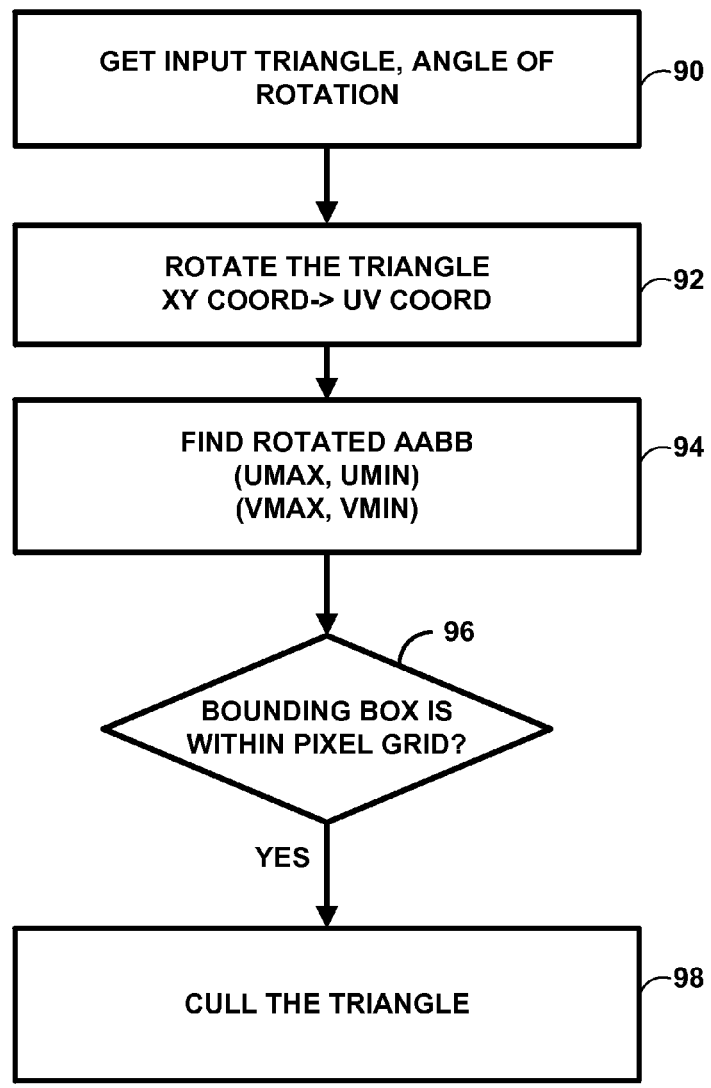
FIG. 7 is a flowchart showing an example method of zero pixel culling of the disclosure.

FIG. 7 is a flowchart showing an example method of zero pixel culling of the disclosure. It should be understood for the purposes of example that zero pixel culling engine 38 may perform some or all the techniques illustrated in FIG. 7. Zero pixel culling engine 38 may be configured to get an input triangle, and an angle of rotation (90). Zero pixel culling engine 38 may rotate the triangle x-y-coordinates to produce u-v coordinates (92). Zero pixel culling engine 38 may then find a rotated anti-aliased bounding box (AABB), having maximum and minimum u-v coordinates (94). Umax corresponds to the maximum u-coordinate, and Umin corresponds to the minimum u-coordinate. Vmin corresponds to the minimum v-coordinate, and Vmax corresponds to the maximum v-coordinate.

Zero pixel culling engine 38 determines whether the bounding box is within the pixel grid (96). If zero pixel culling engine 38 is within the pixel grid, ("Yes" branch of decision box 96), zero pixel culling engine 38 culls the triangle (98).

Figure 8:
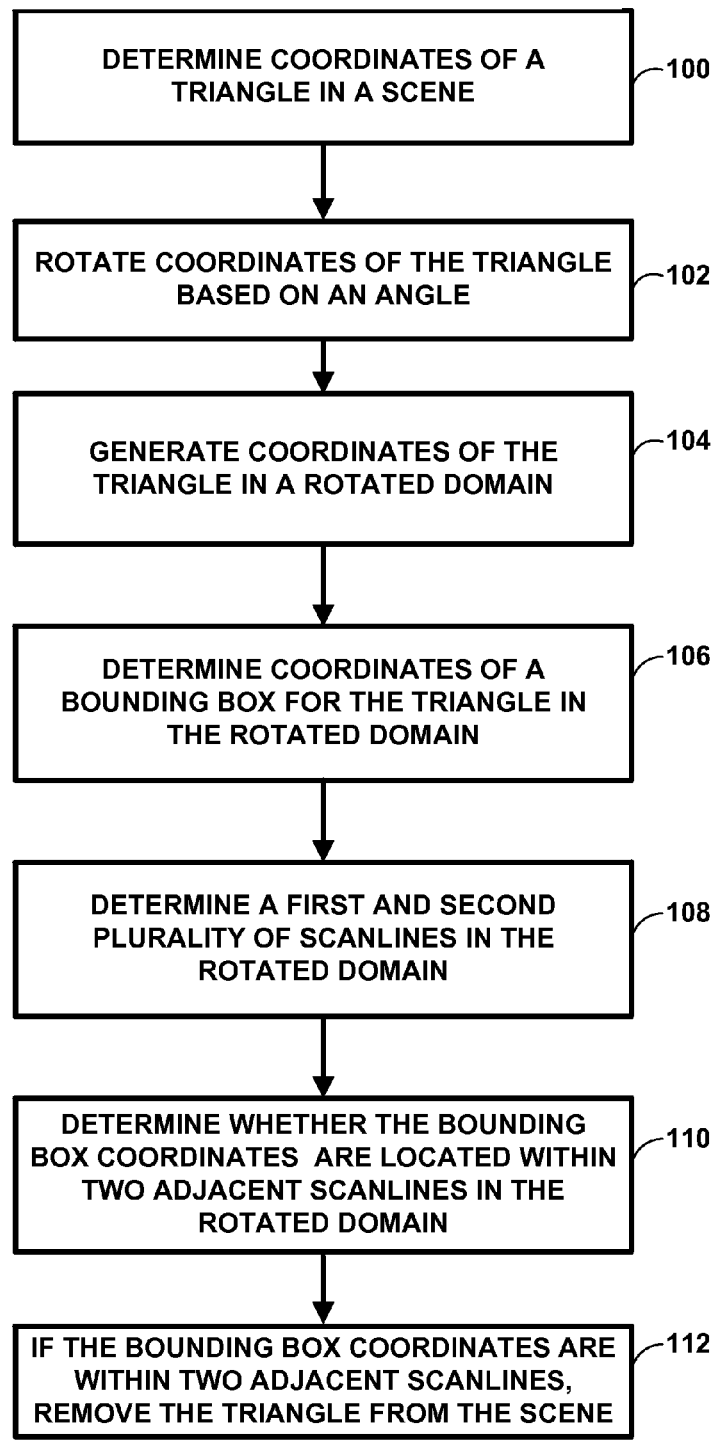
FIG. 8 is a flowchart showing an example method of the disclosure.

FIG. 8 is a flowchart showing an example method of the disclosure. The method of FIG. 4 may be carried out by one or more hardware units of GPU 12, including TSE 37. FIG. 8 depicts a method in which TSE 37 of GPU 12 may be configured to determine coordinates of a triangle (100), wherein the triangle is part of a scene to be rendered by GPU 12, and rotate coordinates of the triangle based on an angle (102). To rotate the coordinates of the triangle, TSE 37 may be configured to generate coordinates of the triangle in a rotated domain (104), and determine coordinates of a bounding box in the rotated domain based on the coordinates of the triangle in the rotated domain (106). TSE 37 may be further configured to determine a first plurality of parallel scanlines in the rotated domain, and to determine a second plurality of parallel scanlines in the rotated domain in which the second plurality of parallel scanlines is perpendicular to the first plurality of parallel scanlines (108). TSE 37 may be further configured to determine whether the bounding box coordinates in the rotated domain are located within two adjacent scanlines of the first plurality of scanlines or within two adjacent scanlines within the second plurality of scanlines (110). Responsive to determining that the bounding box coordinates are located within the two adjacent scanlines: TSE 37 may remove the triangle from the scene (112).

In one or more examples, the functions described above may be implemented in hardware, software, firmware, or any combination thereof. If implemented in software, the functions may be stored as one or more instructions or code on an article of manufacture comprising a non-transitory computer-readable medium. Computer-readable media may include computer data storage media. Data storage media may be any available media that can be accessed by one or more computers or one or more processors to retrieve instructions, code and/or data structures for implementation of the techniques described in this disclosure. By way of example, and not limitation, such computer-readable media can comprise RAM, ROM, EEPROM, CD-ROM or other optical disk storage, magnetic disk storage, or other magnetic storage devices, flash memory, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

The code may be executed by one or more processors, such as one or more DSPs, general purpose microprocessors, ASICs, FPGAs, or other equivalent integrated or discrete logic circuitry. In addition, in some aspects, the functionality described herein may be provided within dedicated hardware and/or software modules. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A method performed by a graphics processing unit (GPU), the method comprising:
   determining coordinates of a primitive in a first coordinate domain, wherein the primitive is part of a scene to be rendered by the GPU using multi-sample anti-aliasing;
   rotating the coordinates of the primitive based on a 45 degree angle, wherein rotating the coordinates of the primitive generates coordinates of the primitive in a first rotated coordinate domain, the first rotated coordinate domain being different than the first coordinate domain;
determining coordinates of a first bounding box in the first rotated coordinate domain based on the coordinates of the primitive in the first rotated coordinate domain;
determining a first plurality of parallel scanlines in the first rotated coordinate domain;
determining a second plurality of parallel scanlines in the first rotated coordinate domain, wherein the second plurality of parallel scanlines is perpendicular to the first plurality of parallel scanlines;
determining whether the first bounding box coordinates in the first rotated coordinate domain are located within a first two adjacent scanlines of the first plurality of scanlines or within a second two adjacent scanlines of the second plurality of scanlines;
responsive to determining that the first bounding box coordinates are located within the first two adjacent scanlines or the second two adjacent scanlines:
removing the primitive from the scene such that subsequent rasterization computations for the primitive are not performed;
rotating the coordinates of the primitive based on a 63.5 degree angle, wherein rotating the coordinates of the primitive generates coordinates of the primitive in a second rotated coordinate domain, the second rotated coordinate domain being different than the first coordinate domain;
determining coordinates of a second bounding box in the second rotated coordinate domain based on the coordinates of the primitive in the second rotated coordinate domain;
determining a third plurality of parallel scanlines in the second rotated coordinate domain;
determining a fourth plurality of parallel scanlines in the second rotated coordinate domain, wherein the fourth plurality of parallel scanlines is perpendicular to the third plurality of parallel scanlines;
determining whether the second bounding box coordinates in the second rotated coordinate domain are located within a first two adjacent scanlines of the third plurality of scanlines or within a second two adjacent scanlines of the fourth plurality of scanlines; and
responsive to determining that the second bounding box coordinates are located within the first two adjacent scanlines of the third plurality of scanlines or the second two adjacent scanlines of the fourth plurality of scanlines:
removing the primitive from the scene such that subsequent rasterization computations for the primitive are not performed.

2. The method of claim 1, wherein rotating the primitive further comprises:
rotating the primitive coordinates according to the transformation matrix:

$$\begin{bmatrix} u \\ v \end{bmatrix} = \begin{bmatrix} \cos\theta & -\sin\theta \\ \sin\theta & \cos\theta \end{bmatrix} \begin{bmatrix} x \\ y \end{bmatrix},$$

wherein u and v are coordinates of a point in the rotated coordinate domain, and
wherein θ is the 45 degree angle.

3. The method of claim 2, wherein determining that the first bounding box coordinates are located within the first two adjacent scanlines or the second two adjacent scanlines comprises:
determining an absolute value of a difference between a maximum u-coordinate of the first bounding box and a minimum u-coordinate of the first bounding box;
determining an absolute value of a difference between a maximum v-coordinate of the first bounding box and a minimum v-coordinate of the first bounding box; and
responsive to determining that the absolute value of the difference between the maximum u-coordinate and the minimum v-coordinate value is less than one unit in the first rotated coordinate domain, or that the absolute value of the difference between the maximum u-coordinate and the minimum u-coordinate is less than one unit in the first rotated coordinate domain:
determining that the first bounding box coordinates are located within the first two adjacent scanlines or within the second two adjacent scanlines; and
removing the primitive from the scene such that the subsequent rasterization computations for the primitive are not performed.

4. The method of claim 1, wherein intersections of the first plurality of parallel scanlines and the second plurality of parallel scanlines correspond to pixels in the scene.

5. The method of claim 1, further comprising:
multisampling pixels of the primitive, wherein intersections of the first plurality of parallel scanlines and the second plurality of parallel scanlines intersect at multisampled pixels of the primitive.

6. The method of claim 1, wherein the primitive coordinates in the first coordinate domain comprise x-y Cartesian coordinates.

7. An apparatus comprising:
a memory; and
a graphics processing unit (GPU) in communication with the memory, the GPU configured to:
determine coordinates of a primitive in a first coordinate domain, wherein the primitive is part of a scene to be rendered by the GPU using multi-sample anti-aliasing;
rotate the coordinates of the primitive based on a 45 degree angle, wherein to rotate the coordinates of the primitive, the GPU is configured to generate coordinates of the primitive in a first rotated coordinate domain, the first rotated coordinate domain being different than the first coordinate domain;
determine coordinates of a first bounding box in the first rotated coordinate domain based on the coordinates of the primitive in the first rotated coordinate domain;
determine a first plurality of parallel scanlines in the first rotated coordinate domain;
determine a second plurality of parallel scanlines in the first rotated coordinate domain,
wherein the second plurality of parallel scanlines is perpendicular to the first plurality of parallel scanlines;
determine whether the first bounding box coordinates in the first rotated coordinate domain are located within a first two adjacent scanlines of the first plurality of scanlines or within a second two adjacent scanlines of the second plurality of scanlines;
responsive to determining that the first bounding box coordinates are located within the first two adjacent scanlines or the second two adjacent scanlines:
remove the primitive from the scene such that subsequent rasterization computations for the primitive are not performed;

rotate the coordinates of the primitive based on a 63.5 degree angle, wherein to rotate the coordinates of the primitive, the GPU is configured to generate coordinates of the primitive in a second rotated coordinate domain, the second rotated coordinate domain being different than the first coordinate domain;

determine coordinates of a second bounding box in the second rotated coordinate domain based on the coordinates of the primitive in the second rotated coordinate domain;

determine a third plurality of parallel scanlines in the second rotated coordinate domain;

determine a fourth plurality of parallel scanlines in the second rotated coordinate domain, wherein the fourth plurality of parallel scanlines is perpendicular to the third plurality of parallel scanlines;

determine whether the second bounding box coordinates in the second rotated coordinate domain are located within a first two adjacent scanlines of the third plurality of scanlines or within a second two adjacent scanlines of the fourth plurality of scanlines; and responsive to determining that the second bounding box coordinates are located within the first two adjacent scanlines of the third plurality of scanlines or the second two adjacent scanlines of the fourth plurality of scanlines:

remove the primitive from the scene such that subsequent rasterization computations for the primitive are not performed.

8. The apparatus of claim 7, wherein the GPU comprises a triangle setup engine.

9. The apparatus of claim 7, further comprising:
a central processing unit (CPU); and
a display,
wherein the apparatus comprises a mobile computing device.

10. The apparatus of claim 7, wherein to rotate the primitive, the GPU is further configured to:
rotate the primitive coordinates according to the transformation matrix:

$$\begin{bmatrix} u \\ v \end{bmatrix} = \begin{bmatrix} \cos\theta & -\sin\theta \\ \sin\theta & \cos\theta \end{bmatrix} \begin{bmatrix} x \\ y \end{bmatrix},$$

wherein u and v are coordinates of a point in the rotated coordinate domain, and
wherein θ is the 45 degree angle.

11. The apparatus of claim 10, wherein to determine that the first bounding box coordinates are located within the first two adjacent scanlines or the second two adjacent scanlines, the GPU is further configured to:

determine an absolute value of a difference between a maximum u-coordinate of the bounding box and a minimum u-coordinate of the first bounding box;

determine an absolute value of a difference between a maximum v-coordinate of the first bounding box and a minimum v-coordinate of the first bounding box; and responsive to determining that the absolute value of the difference between the maximum u-coordinate and the minimum v-coordinate value is less than one unit in the first rotated coordinate domain, or that the absolute value of the difference between the maximum u-coordinate and the minimum u-coordinate is less than one unit in the first rotated coordinate domain:

determine that the first bounding box coordinates are located within the first two adjacent scanlines or within the second two adjacent scanlines; and remove the primitive from the scene such that the subsequent rasterization computations for the primitive are not performed.

12. The apparatus of claim 7, wherein intersections of the first plurality of parallel scanlines and the second plurality of parallel scanlines correspond to pixels in the scene.

13. The apparatus of claim 7, wherein the GPU is further configured to:
multisample pixels of the primitive, wherein intersections of the first plurality of parallel scanlines and the second plurality of parallel scanlines intersect at multisampled pixels of the primitive.

14. The apparatus of claim 7, wherein the primitive coordinates in the first coordinate domain comprise x-y Cartesian coordinates.

15. An apparatus comprising:
means for determining coordinates of a primitive in a first coordinate domain, wherein the primitive is part of a scene to be rendered using multi-sample anti-aliasing;

means for rotating the coordinates of the primitive based on a 45 degree angle, wherein the means for rotating the coordinates of the primitive comprises means for generating coordinates of the primitive in a first rotated coordinate domain, the first rotated coordinate domain being different than the first coordinate domain;

means for determining coordinates of a first bounding box in the first rotated coordinate domain based on the coordinates of the primitive in the first rotated coordinate domain;

means for determining a first plurality of parallel scanlines in the first rotated coordinate domain;

means for determining a second plurality of parallel scanlines in the first rotated coordinate domain, wherein the second plurality of parallel scanlines is perpendicular to the first plurality of parallel scanlines;

means for determining whether the first bounding box coordinates in the first rotated coordinate domain are located within a first two adjacent scanlines of the first plurality of scanlines or within a second two adjacent scanlines of the second plurality of scanlines;

means for removing the primitive from the scene, such that subsequent rasterization computations for the primitive are not performed, responsive to determining that the first bounding box coordinates are located within the first two adjacent scanlines or the second two adjacent scanlines;

means for rotating the coordinates of the primitive based on a 63.5 degree angle, wherein the means for rotating the coordinates of the primitive generates coordinates of the primitive in a second rotated coordinate domain, the second rotated coordinate domain being different than the first coordinate domain;

means for determining coordinates of a second bounding box in the second rotated coordinate domain based on the coordinates of the primitive in the second rotated coordinate domain;

means for determining a third plurality of parallel scanlines in the second rotated coordinate domain;

means for determining a fourth plurality of parallel scanlines in the second rotated coordinate domain, wherein the fourth plurality of parallel scanlines is perpendicular to the third plurality of parallel scanlines;

means for determining whether the second bounding box coordinates in the second rotated coordinate domain are located within a first two adjacent scanlines of the third plurality of scanlines or within a second two adjacent scanlines of the fourth plurality of scanlines; and means for removing the primitive from the scene, such that subsequent rasterization computations for the primitive are not performed, responsive to determining that the second bounding box coordinates are located within the first two adjacent scanlines of the third plurality of scanlines or the second two adjacent scanlines of the fourth plurality of scanlines.

16. The apparatus of claim 15, wherein the means for rotating the primitive further comprises:

means for rotating the primitive coordinates according to the transformation matrix:

$$\begin{bmatrix} u \\ v \end{bmatrix} = \begin{bmatrix} \cos\theta & -\sin\theta \\ \sin\theta & \cos\theta \end{bmatrix} \begin{bmatrix} x \\ y \end{bmatrix},$$

wherein u and v are coordinates of a point in the rotated coordinate domain, and wherein $\theta$ is the 45 degree angle.

17. The apparatus of claim 16, wherein the means for determining that the first bounding box coordinates are located within the first two adjacent scanlines or the second two adjacent scanlines comprises:

means for determining an absolute value of a difference between a maximum u-coordinate of the first bounding box and a minimum u-coordinate of the first bounding box;

means for determining an absolute value of a difference between a maximum v-coordinate of the first bounding box and a minimum v-coordinate of the first bounding box;

means for determining that the first bounding box coordinates are located within the first two adjacent scanlines or within the second two adjacent scanlines responsive to determining that the absolute value of the difference between the maximum u-coordinate and the minimum v-coordinate value is less than one unit in the first rotated coordinate domain, or that the absolute value of the difference between the maximum u-coordinate and the minimum u-coordinate is less than one unit in the first rotated coordinate domain; and means for removing the primitive from the scene such that the subsequent rasterization computations for the primitive are not performed.

18. The apparatus of claim 15, further comprising:
means for multisampling pixels of the primitive,
wherein intersections of the first plurality of parallel scanlines and the second plurality of parallel scanlines intersect at multisampled pixels of the primitive.

19. A non-transitory computer-readable storage medium having instructions stored thereon that, when executed, cause at least one processor to:

determine coordinates of a primitive in a first coordinate domain, wherein the primitive is part of a scene to be rendered by the at least one processor using multi-sample anti-aliasing;

rotate the coordinates of the primitive based on a 45 degree angle, wherein the instructions that cause the at least one processor to rotate the coordinates of the primitive cause the at least one processor to generate coordinates of the primitive in a first rotated coordinate domain, the first rotated coordinate domain being different than the first coordinate domain;

determine coordinates of a first bounding box in the first rotated coordinate domain based on the coordinates of the primitive in the first rotated coordinate domain;

determine a first plurality of parallel scanlines in the first rotated coordinate domain;

determine a second plurality of parallel scanlines in the first rotated coordinate domain, wherein the second plurality of parallel scanlines is perpendicular to the first plurality of parallel scanlines;

determine whether the first bounding box coordinates in the first rotated coordinate domain are located within a first two adjacent scanlines of the first plurality of scanlines or within a second two adjacent scanlines of the second two adjacent scanlines;

responsive to determining that the first bounding box coordinates are located within the first two adjacent scanlines or the second plurality of adjacent scanlines:
remove the primitive from the scene such that subsequent rasterization computations for the primitive are not performed;

rotate the coordinates of the primitive based on a 63.5 degree angle, wherein rotating the coordinates of the primitive generates coordinates of the primitive in a second rotated coordinate domain, the second rotated coordinate domain being different than the first coordinate domain;

determining coordinates of a second bounding box in the second rotated coordinate domain based on the coordinates of the primitive in the second rotated coordinate domain;

determine a third plurality of parallel scanlines in the second rotated coordinate domain;

determine a fourth plurality of parallel scanlines in the second rotated coordinate domain, wherein the fourth plurality of parallel scanlines is perpendicular to the third plurality of parallel scanlines;

determine whether the second bounding box coordinates in the second rotated coordinate domain are located within a first two adjacent scanlines of the third plurality of scanlines or within a second two adjacent scanlines of the fourth plurality of scanlines; and responsive to determining that the second bounding box coordinates are located within the first two adjacent scanlines of the third plurality of scanlines or the second two adjacent scanlines of the fourth plurality of scanlines:
remove the primitive from the scene such that subsequent rasterization computations for the primitive are not performed.

20. The non-transitory computer-readable storage medium of claim 19, wherein instructions further cause the at least one processor to:

rotate the primitive coordinates according to the transformation matrix:

$$\begin{bmatrix} u \\ v \end{bmatrix} = \begin{bmatrix} \cos\theta & -\sin\theta \\ \sin\theta & \cos\theta \end{bmatrix} \begin{bmatrix} x \\ y \end{bmatrix},$$

wherein u and v are coordinates of a point in the rotated coordinate domain, and wherein $\theta$ is the 45 degree angle.

21. The non-transitory computer-readable storage medium of claim 20, wherein instructions further cause the at least one processor to:

determine an absolute value of a difference between a maximum u-coordinate of the first bounding box and a minimum u-coordinate of the first bounding box;

determine an absolute value of a difference between a maximum v-coordinate of the first bounding box and a minimum v-coordinate of the first bounding box;

determine that the bounding box coordinates are located within the first two adjacent scanlines or within the second two adjacent scanlines responsive to determining that the absolute value of the difference between the maximum u-coordinate and the minimum v-coordinate value is less than one unit in the first rotated coordinate domain, or that the absolute value of the difference between the maximum u-coordinate and the minimum u-coordinate is less than one unit in the first rotated coordinate domain; and remove the primitive from the scene such that the subsequent rasterization computations for the primitive are not performed.

22. The non-transitory computer-readable storage medium of claim 19, wherein instructions further cause the at least one processor to:

multisample pixels of the primitive, wherein intersections of the first plurality of parallel scanlines and the second plurality of parallel scanlines intersect at multisampled pixels of the primitive.

* * * * *